No. 723,287. PATENTED MAR. 24, 1903.
R. C. LAWSON & M. McLAREN.
TEA LEAF HOLDER.
APPLICATION FILED AUG. 26, 1901.
NO MODEL.

Witnesses.
C. H. Keeney.
Erna Schmidt.

Inventors.
Roberta C. Lawson
Mary McLaren
By Benedict & Morsell
Attorneys.

UNITED STATES PATENT OFFICE.

ROBERTA C. LAWSON AND MARY McLAREN, OF MILWAUKEE, WISCONSIN.

TEA-LEAF HOLDER.

SPECIFICATION forming part of Letters Patent No. 723,287, dated March 24, 1903.

Application filed August 26, 1901. Serial No. 73,237. (No model.)

*To all whom it may concern:*

Be it known that we, ROBERTA C. LAWSON and MARY McLAREN, citizens of the United States, residing at Milwaukee, Wisconsin, have invented a new and useful Improvement in Tea-Leaf Holders, of which the following is a description, reference being had to the accompanying drawings, which are a part of this specification.

Heretofore it has been common to prepare "tea"—the infusion so designated—by putting a quantity of tea-leaves in a pot and pouring hot water thereon, thus providing a considerable supply of tea, from which a cup of tea was to be poured or drawn off for individual use. This practice involves the use of a considerable quantity of tea-leaves to prepare the desired supply of tea, and the tea, if not used directly, soon becomes stale or wanting in freshness, and therefore unsatisfactory, and frequently a large portion of the tea thus prepared and not used directly has to be thrown away, thus involving much waste and corresponding expense. To obviate this, our object in the present invention is to provide means whereby a small quantity of tea, so much only as is required for a single cup of tea, can be placed in a cup and have water poured thereon to produce only a cup of tea fresh for immediate use. By this means only so much of tea-leaves is used as is required for the single cup of tea, and thereby a cup of fresh fragrant tea is prepared and the waste occurring by preparing a larger quantity is obviated; but to put the tea-leaves in the cup in which the infusion is prepared and from which it is to be drunk requires that the leaves shall be held together against separating and being dispersed through the infusion to be drunk up, which would spoil the pleasure of the drink, and yet the leaves must be so held together as to be exposed fully to the water poured thereon in the cup, so that their qualities shall be freely given off and taken up by the water to produce the desired infusion. It is also important from a financial standpoint that the means for thus holding the tea-leaves in the cup shall be inexpensive as well as convenient for ready use. Our invention is directed to secure these objects.

The invention consists of the device and its parts and combinations of parts, as herein described and claimed or the equivalent thereof.

Figure 1:
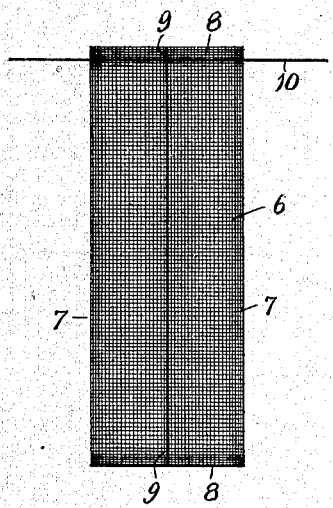
Figure 2:
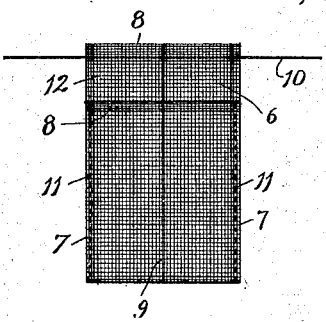
Figure 4:
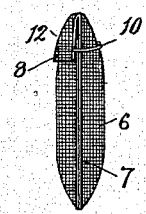
Figure 3:
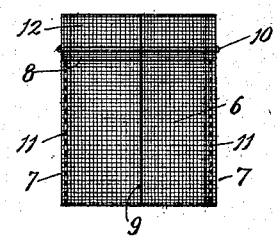
Figure 5:
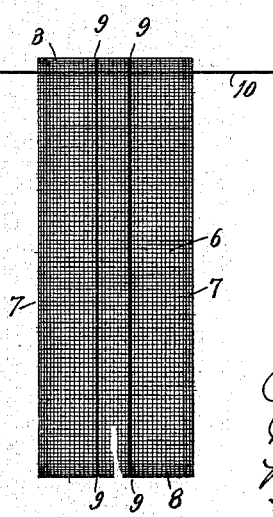

In the drawings, Figure 1 represents a strip of open-mesh fabric employed in the construction of our improved device and in which is shown centrally longitudinal stiffening means and at the upper extremity of which is shown transversely-disposed stiffening and closing means. Fig. 2 shows the strip of fabric in Fig. 1 folded over upon itself and stitched along its side edges, forming a pocket-like construction having a flap at its open end. Fig. 3 represents the pocket-like device of Fig. 2 with the flap at the upper end folded down over the top end of the pocket and inclosed by the means provided. Fig. 4 is an edge view of the pocket shown in Fig. 3, the sides of the pocket being spread apart as they are when the pocket is filled with tea-leaves. Fig. 5 is a view of a strip of material for constructing a pocket in which the longitudinal stiffening means is shown in plurality instead of a single means, as shown in Fig. 1.

Our novel tea-holding pocket is constructed of open-mesh woven fabric 6, inexpensively made of cotton thread, and which is preferably provided with marginal selvages 7 and also with end selvages 8 8. If the material is not provided with these selvages, their purpose, which is the strengthening of the fabric at the edges and the ends, may be secured by the common expedient of turning over the edges and ends of the material, forming hems in a manner well known. For stiffening this fabric longitudinally, whereby the pocket when completed is held extended sufficiently to keep its shape generally, we employ small wire 9, which may be woven longitudinally into the fabric or otherwise secured thereto. Such wire or stiffening means may be employed singly, as shown in Fig. 1, or may be employed in plurality, as indicated in Fig. 5.

A transversely-disposed closing means is provided, which is conveniently formed of a small wire 10, secured to one end of the material 6 conveniently by being woven into the selvage 8 at that end of the strip or in any equivalent way. This wire 10 projects laterally in both directions from the fabric 6, as shown in Figs. 1, 2, and 5. The pocket is formed by folding the end of the fabric 6 not having the wire 10 over onto the fabric itself at a distance from the end having the wire 10. The edges of the folded material are then stitched together, as shown at 11 in Figs. 2 and 3, thus forming a pocket with a flap 12 at the open end thereof. This is the form of the device as completed, in which form the pocket is to be placed on the market for general use.

In use a supply of tea-leaves is placed in the pocket and the flap 12 is then turned down over the end of the pocket, as shown in Fig. 4. In this form the filled pocket is placed in a cup and boiling water poured thereon, which soon forms the desired infusion, as the water can freely pass through the walls of the pocket and act upon the tea-leaves, causing them to give off their fragrant qualities.

While our pocket is especially adapted for holding tea-leaves, we desire to secure the right thereto for whatever analogous use it can be put to.

What we claim as our invention is—

1. A holder for tea-leaves or analogous use, consisting of a small pocket provided with a terminal flap and constructed of open-mesh fabric and having a longitudinally-extending stiffening means, a transversely-disposed and laterally-projecting bendable fastening means secured to the terminal and closing flap thereon.

2. A holder for tea-leaves or analogous use, comprising a pocket constructed of open-mesh fabric provided with a flap at its open end formed of the extension of one wall of the pocket fabric, a longitudinal stiffening-wire in the pocket and its flap, and a transversely-disposed and laterally-projecting closing-wire in the flap at a distance from the open end of the pocket.

3. A tea-leaf holder, comprising a pocket of open-mesh woven fabric, the pocket being open at one end only and having one wall of the open-mesh material of the pocket extended beyond the mouth of the pocket forming a flap, and a wire transversely of the pocket woven in lieu of a strand of the fabric into the fabric near the edge of the flap and extending laterally beyond the side edges of the pocket, the wire being adapted when the flap is folded over the open end of the pocket and down on the front wall thereof to be bent around the edges of the pocket and against the outer surface of the rear wall thus securing the closed end of the pocket.

4. In a tea-leaf holder, a pocket constructed of open-mesh fabric, and provided with a flap of the pocket material projecting beyond the open end of the pocket, a transverse wire in the flap and projecting laterally beyond the edges of the pocket adapted when the flap is turned over the mouth of the pocket to be bent around and upon the pocket the wire being of a size substantially the same as a strand of the fabric.

In testimony whereof we affix our signatures in presence of two witnesses.

ROBERTA C. LAWSON.
MARY McLAREN.

Witnesses:
C. T. BENEDICT,
ERNA SCHMIDT.